United States Patent
Eromäki

(12) 
(10) Patent No.: US 6,460,221 B1
(45) Date of Patent: Oct. 8, 2002

(54) HINGED ELECTRONIC DEVICE

(75) Inventor: Marko Eromäki, Tampere (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/718,202

(22) Filed: Nov. 21, 2000

(30) Foreign Application Priority Data

Nov. 30, 1999 (FI) .................................................. 992564

(51) Int. Cl.⁷ .................................................. E05F 1/08
(52) U.S. Cl. .............................. 16/286; 16/277; 16/285
(58) Field of Search .......................... 16/285, 286, 287, 16/293–295, 277, 323, 291, 335, 375; 220/810, 827, 829, 831–834; 312/223.1; 361/680, 681, 683

(56) References Cited

U.S. PATENT DOCUMENTS

| | | | | |
|---|---|---|---|---|
| 1,757,075 A | * | 5/1930 | EarHart | 16/371 |
| 3,643,291 A | * | 2/1972 | Clark | 16/289 |
| 4,731,904 A | * | 3/1988 | Sprague | 16/286 |
| 5,168,426 A | * | 12/1992 | Hoving et al. | 16/361 |
| 5,401,096 A | * | 3/1995 | Stang | 16/291 |
| 5,494,447 A | * | 2/1996 | Zaidan | 16/361 |
| 5,742,475 A | * | 4/1998 | Riddiford | 16/291 |
| 6,167,591 B1 | * | 1/2001 | Daoud | 16/277 |
| 6,290,411 B1 | * | 9/2001 | Shirai | 248/175 |

FOREIGN PATENT DOCUMENTS

EP    0801489    10/1997

OTHER PUBLICATIONS

Japanese Patent Application No. JP 553685 and English translation.

\* cited by examiner

Primary Examiner—Chuck Y. Mah
(74) Attorney, Agent, or Firm—Perman & Green, LLP

(57) ABSTRACT

A hinge structure and a hinged electronic device in order to connect two parts of a foldable electronic device rotatably to one another, the hinge structure (3) comprising a hinge (4), about the rotation axis of which the parts (1, 2) are rotatable with relation to one another, and at least one spring element (5) which controls the operation of the hinge. The spring element (5) is attached at its first end (6a) to the cover part (1) and at its second end (6b) to the base part (2) such that either end (6a, 6b) may freely rotate in the attachment means (7) of the respective part about a rotation axis that is substantially parallel with the rotation axis of the hinge (4).

14 Claims, 3 Drawing Sheets

HINGED ELECTRONIC DEVICE

The invention relates to a hinge structure for rotatably connecting two parts of a foldable electronic device to each other, the hinge structure comprising a hinge, about the rotation axis of which the parts are rotatable with relation to one another, and at least one spring element which controls the operation of the hinge.

DESCRIPTION OF THE PRIOR ART

The invention also relates to a hinged electronic device.

Some electronic devices are foldable comprising a base part and a cover part rotatably connected thereto by hinge means. Such electronic devices—in the following referred to as the device—are typically e.g. mobile telephones, laptops, communicators, portable computers and the like. To improve portability and manageability of the device, for instance, the base part and the cover part of the device can be folded against one another. On the other hand, by folding the device open, i.e. the cover part apart from the base part, a display extending substantially throughout the cover part, and correspondingly, a keyboard extending substantially throughout the base part will be generally available for use. The device may comprise more than two parts that rotate with relation to one another.

Means that control the rotation movement are generally arranged in the hinge structure of the device, such as friction means, which provide a pleasant response to the rotational movement by resisting the rotation of the parts with relation to each other in a suitable manner, and on the other hand, which lock the parts at a desired angle. In addition, the hinge structure may comprise specific locking means for keeping the device open in an operating position. For instance, EP 801,489 discloses a solution in which locking into operating position is arranged such that springs arranged at the axis of the hinge axially force a first pivot pin having grooves at one end and being connected to the first part of the device end-on-end against a second pivot pin connected coaxially to the second part of the device, ridges provided at the end of the second pivot pin locking in said grooves at a predetermined opening angle.

Friction elements integrated with hinge structures are often rather complicated comprising several small components and therefore the manufacture and assembly thereof is relatively cost intensive. Moreover, as a result of repeated opening and closing of the device, the friction of the friction elements gradually reduces and thereby the rotating properties become less precise.

The device must also be lockable to a completely closed position, in order that it would not open unintentionally. Locking is generally implemented by locking means comprising a plurality of components and thus causing component and assembly costs, and in time, the reliability of the locking means may deteriorate.

When the device is opened into an operating position, it must naturally stand steadily, in other words, a force vector of the mass centre of the device must pass through a bearing area limited by supporting points in the base parts of the device. It is known to arrange the mass centre in the base part of the device by disposing a necessary amount of electronic components of the device in the base part. However, when the size of the display increases, or for some such reason, the weight of the cover part may proportionally increase such that the force vector of the mass centre is located on the edge of the bearing area or even outside it. Unsupported, the device will readily overturn to rest on the cover part, which substantially hampers the use of the device. On the other hand, if the display of the device is a touch screen, the device may relatively easily overturn to rest on the cover part while the display is touched, even though the mass centre would clearly be on the side of the base part. It is known to reduce the risk of overturn by arranging in the device a mechanical supporting structure which extends the bearing area of the device under the cover part. The supporting structure is an extra structure causing extra costs in the device. In addition, the supporting structure imposes restrictions to the device design and may also have a negative effect on the appearance of the device.

SUMMARY OF THE INVENTION

The object of the present invention is to provide a hinge structure and a hinged electronic device which avoid the above-mentioned disadvantages.

The hinge structure of the invention is characterized in that a spring element is rotatably attached at its first end to an attachment means arranged in the cover part and at its second end to an attachment means arranged in the base part such that either end may freely rotate in their attachment means about an imaginary rotation axis that is substantially parallel with the rotation axis of the hinge.

The hinged electronic device of the invention is characterized by comprising at least one hinge structure according to claims 1 to 13.

The basic idea of the invention is that the hinge structure is implemented without friction elements such that the hinge is a simple means enabling the rotation of the device parts, and a spring element controlling said means is positioned outside the hinge and attached at its first end to the cover part and at its second end to the base part such that either end may rotate freely at their attachment point about an axis that is substantially parallel with the rotation axis of the hinge. The idea of one preferred embodiment is also that after the opening angle of the device has reached a given limit angle, spring force of the spring element forces the device parts into a given, predetermined operating position. Further, the idea of a second preferred embodiment is that the opening angles being smaller than said limit angle, spring force of the spring element presses the parts against each other into a completely closed position. The idea of yet a third preferred embodiment is that while the device is open in the operating position, the spring element extends the bearing area of the device.

The invention has an advantage that one, simple, reliable and inexpensive structure provides required resistance in the hinge structure. Further, one preferred embodiment has an advantage that the hinge structure locks the device into operating position. Still further, a second preferred embodiment has an advantage that the hinge structure also locks the parts of the device in the closed position against each other. An advantage of yet a third preferred embodiment is that the spring element extends the bearing area of the device in the operation position under the cover part such that the device stands more steadily in an appropriate position.

BRIEF DESCRIPTION OF THE DRAWINGS

In the following, the invention will be described in greater detail with reference to the attached drawings, in which.

DETAILED DESCRIPTION OF THE INVENTION

Figure 1:
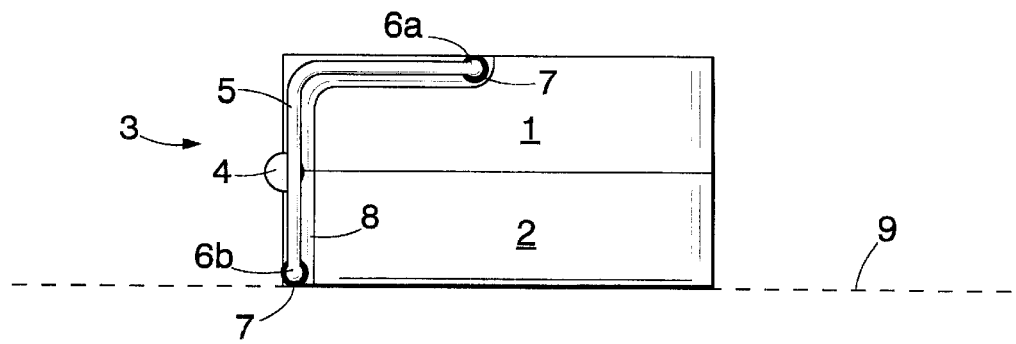
FIG. 1 is a schematic side view of an embodiment of a hinge structure of the invention in a completely closed position.

FIG. 1 is a schematic side view of one embodiment of a hinge structure of the invention in a completely closed position. It should be noted in this connection that the dimensions of the hinge structure and the device as presented in FIG. 1 as well as in other figures are given by way of example only. The device comprises a cover part 1 and a base part 2 which are rotatably interconnected by a hinge structure 3. The cover part 1 folds against the base part 2. A display of the device is typically positioned on the surface of the cover part 1 that faces the base part 2, and a keyboard is positioned on the corresponding surface of the base part 2. Despite the closed position, some functions of the device are operable by means of keyboards, displays and the like arranged on the outer surfaces of the device. Other components and elements known per se to the person skilled in the art are also positioned in either part 1, 2, but they are not described in greater detail herein. The hinge structure 3 comprises a hinge 4, whose rotation axis is perpendicular to the plane of the figure, and a spring element 5. The structure of the hinge 4 is known per se: for instance, it can be implemented with hinge sleeves attached to a first part 1 or 2, a pivot pin attached to a second part 1 or 2 being arranged through said hinge sleeves, or in some such manner known per se. The spring element 5 is curved in shape and its first end 6a is attached rotatably to the cover part 1 and the second end 6b is attached rotatably to the base part 2, respectively. The ends 6a, 6b of the spring element 5 are attached rotatably to attachment means 7 arranged in the parts 1, 2 such that either end 6a, 6b can rotate freely about an imaginary rotation axis passing through the respective attachment means 7 in parallel with the rotation axis of the hinge 4.

The spring element 5 is a tensioned condition, in which the spring force of the element 5 tends to bend the first end 6a of the element 5 towards the second end 6b, whereby the cover part and the base part 1, 2 press and lock against each other. Hence, separate locking means that would cause costs in manufacture and assembly and become unreliable in time are not required to lock the device in a completely closed position. The spring element 5 can be made of e.g. steel or other elastic metal, elastic plastic material or a combination thereof or the like.

The spring structure 3 may comprise one or more spring elements 5. In the embodiment of FIG. 1, the whole spring element 5 is substantially arranged in a groove 8 provided on the side of the device, but it is also possible to place the spring element 5 at any point in the lateral direction of the device arranged either in the groove or otherwise on the outer surface of the device. The spring element 5 and the groove 8 can be designed compatible with one another such that, in the completely closed position, the spring element forms a substantially even surface with the outer surface of the device, which produces an esthetically pleasing effect.

Figure 2:
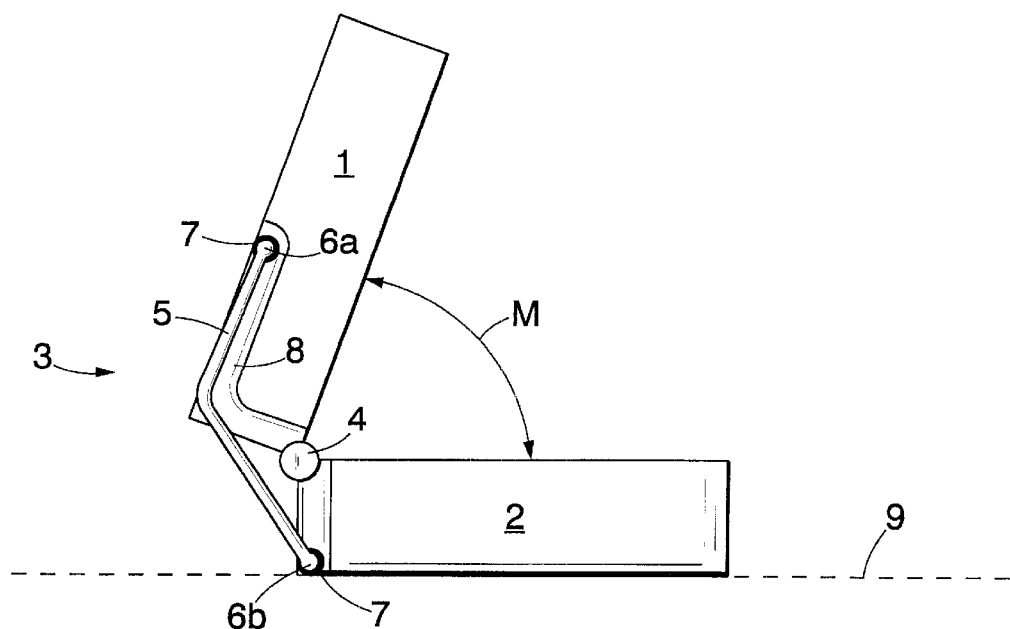
FIG. 2 is a schematic side view of the hinge structure of FIG. 1, while a device is partly open.

FIG. 2 is a schematic side view of the embodiment of the hinge structure in FIG. 1 while the device is partly open. The cover part 1 is rotated about the hinge 4 at an angle M with the base part 2, at which angle M the distance between the ends 6a, 6b of the spring element 5 reaches the maximum value and at which the rotation axis of the spring element ends 6a, 6b and the rotation axis of the hinge are on the same line. Thus, the angle M is a limit angle, and at opening angles smaller than the limit angle the spring force of the spring element 5 forces the cover part against the base part 2 and at opening angles wider than the angle M the spring forces the opening angle still wider. In other words, the spring element 5 resists the opening of the device starting from the completely closed position shown in FIG. 1 until the opening angle M is reached. If the opening movement is still continued, the spring element 5 forces the device to open in the operating position determined by the hinge structure 3 shown in FIG. 3. In the embodiment of the figure, the angle M is about 70° but other values are also possible when the ends 6a, 6b of the spring element 5 are positioned in another manner with relation to the hinge 4. Since both ends 6a, 6b of the spring element 5 can freely rotate with relation to their respective attachment means 7 when the opening angle changes, no other substantial forces are generated in the spring element 5 than the spring forces generated by changes in the distance between the ends 6a, 6b.

Figure 3:
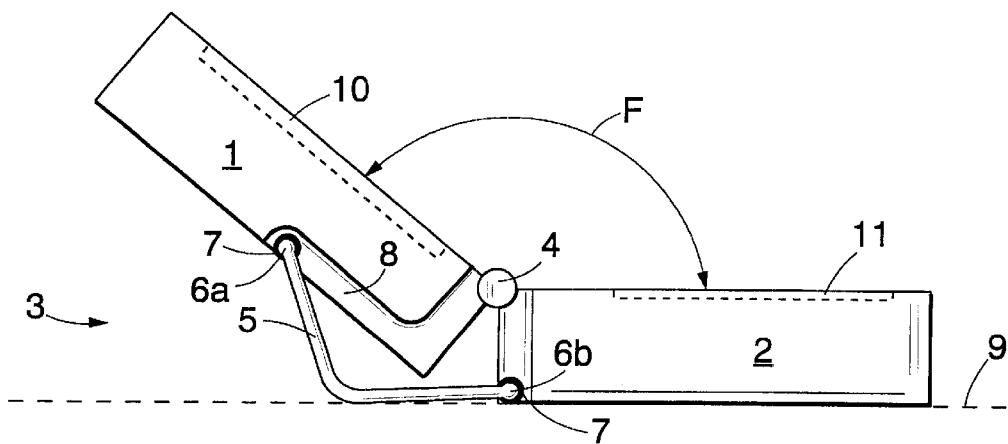
FIG. 3 is a schematic side view of the hinge structure of FIG. 1, while the device is in the operating position.

FIG. 3 is a schematic side view of the embodiment of the hinge structure in FIG. 1 while the device is in the operating position. The cover part 1 is at an angle F, which is about 140° in the embodiment of the figure, with relation to the base part 2, whereby the display 10 of the device is in an advantageous position ergonomically with relation to the keyboard 11. To lock the operating position into place, the spring element 5 can be formed, for instance, such that its spring force presses the cover part 1 against a mechanical stopper which prevents the device from opening any wider. The desired operating position can also be achieved by designing the hinge structure 3 such that, in the operating position, the spring element is in a rest position, whereby it resists changes in position in either direction. The device can be closed by rotating the cover part 1 with relation to the base part 2 against the spring force of the spring element 5 until the balanced state shown in FIG. 2, whereafter the spring force of the spring element 5 folds the parts 1, 2 of the device against each other if the closing rotational motion continues. Damping means, such as rubber pads, which dampen the contact between the parts 1, 2, are preferably arranged between the parts 1, 2.

The spring element 5 extends under the cover part 1 unfolded into operating position substantially on the plane of the bottom of the base part 2, which extends the bearing area of the device and improves the device to stand upright. The device stands more steadily in an appropriate operating position and will not overturn in the opening direction of the cover part 1 to rest on the cover part 1. On the other hand, it is possible to arrange in the cover part 1 more electronic and other components, or e.g. a larger display, than in the prior art devices, in which the mass centre of the device must be located substantially on the side of the base part.

Figure 4:
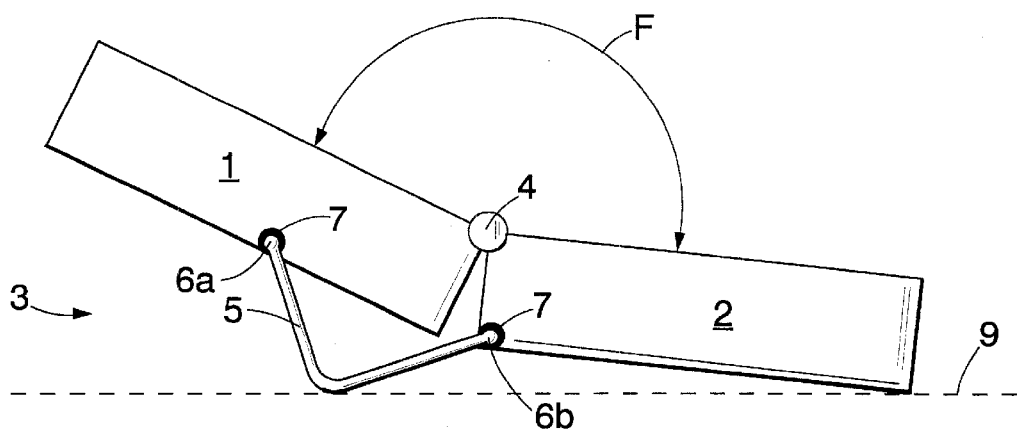
FIG. 4 is a schematic side view of a second embodiment of the hinge structure of the invention while the device is in the operating position.

FIG. 4 shows a schematic side view of a second embodiment of the hinged electronic device of the invention in the operating position. The angle F in the operation position between the cover part 1 and the. base part 2 is about 160°, i.e. wider than in the embodiment of FIG. 3. The hinge structure 3 is designed such that in the operating position of the device a portion of the spring element 5 extends under the lower surface of the base part 2. The spring element 5 thus lifts the rear edge of the base part 2 off the plane 9 under the device, whereby the keyboard 11 arranged in the base part 2 turns towards the user in an extremely advantageous position ergonomically.

Figure 5:
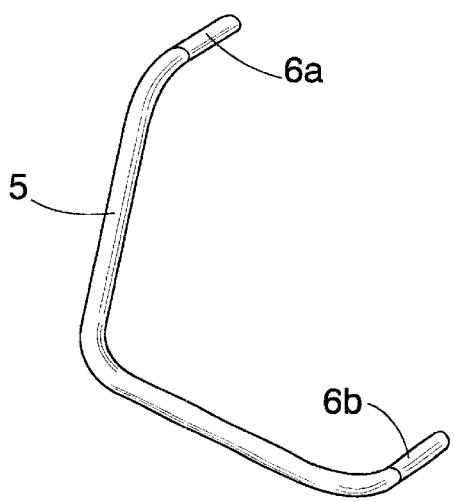
FIG. 5 is a schematic perspective view of a hinge element in a hinge structure of the invention.

FIG. 5 shows a schematic perspective view of one embodiment of the spring element in the hinge structure of the invention in a rest position. The spring element 5 comprises a first end 6a and a second end 6b which are substantially parallel and which are arranged in their respective attachment means 7 in the cover part and base part during assembly of the hinge structure. In order to facilitate the attachment, grooves, protrusions or other corresponding forms or structures known per se can be provided in the ends 6a, 6b. The curved portion between the ends 6a, 6b of the spring element 5 is the actual spring part which, on one hand, deflects when the distance between the ends changes, and on the other hand, the spring force resulting from said deflection tends to return the spring element 5 to its rest position. The shape of the spring element 5 can also be curved in some other manner than what is shown in the figure, approximately L-shaped, discontinuously curved form, in which two substantially straight portions are at an angle with each other. In the present application, the term curved refers to a form that may comprise two or more straight portions at an angle with each other, or a continuously curved portion, such as an arc of a circle, or combinations thereof. It is substantial in the shape of the spring element 5 that when the distance between the ends of the element changes on rotating the parts 1, 2, the element 5 deflects controllably and regularly in the same manner.

The cross section of the spring element 5 of FIG. 5 is round but it can also be e.g. rectangular, moreover, the cross section of the spring element need not necessarily be the same at each point as in the figure. The element 5 is simple and fast to manufacture, so the manufacturing costs are low. In addition, it is easy to handle a relatively large but uncomplicated element 5 during the assembly of the device. The spring element 5 can be made of metal or other conductive material and connected to the electronic components of the device such that e.g. ground plane between the cover part 1 and the base part 2 is supplied via the element 5. By coating the conductive spring element 5 with a suitable insulating material it is also possible to supply operating voltage from one part 1, 2 to the other via said spring element.

Figure 6:
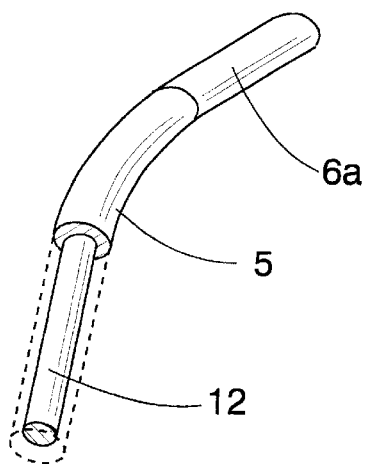
FIG. 6 is a schematic view of a part of a second embodiment of the hinge element in the hinge structure of the invention in perspective and partly cut open.

FIG. 6 shows a schematic view of a part of a second embodiment of the hinge element in the hinge structure in perspective and partly cut open. A conductive element 12 interconnecting the element ends 6a, 6b—of which only the first end 6a is shown in the figure, for the sake of clarity—is arranged inside the spring element 5. The conductive element 12 can be, for instance, a thin wire, an RF cable, an optical fibre a like element that can convey signals between the cover part 1 and the base part 2. It is possible to arrange more than one conductive element 12 in the spring element 5 such that each conductive element 12 conveys a separate signal. The conductive element 12 can also be arranged insulated inside the spring element 5 made of conductive material, whereby the ground plane passes via the spring element, and specific signals or operating voltage pass via the conductive element 12 arranged thereto.

Figure 7:
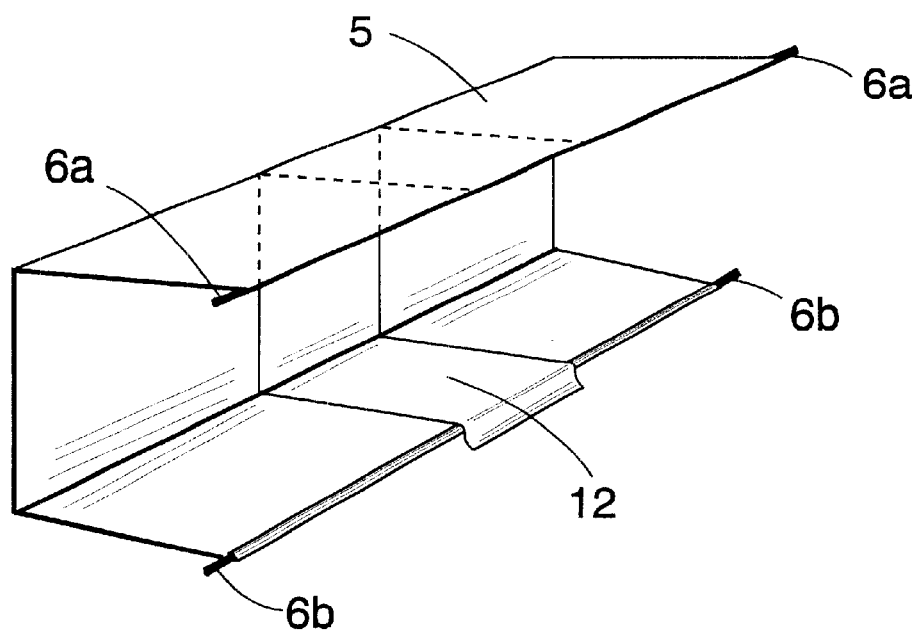
FIG. 7 is a schematic perspective view of a third part of the embodiment of the hinge element in the hinge structure of the invention.

FIG. 7 shows a schematic perspective view of a part of a third embodiment of the hinge element in the hinge structure. The spring element 5 is substantially broader than the element shown in FIGS. 1 to 6, even extending throughout the width of the device. This suitably curved, plate-like element is preferably made of plastic or sufficiently thin metal structure. The conductive element 12 is arranged on the inner surface of the spring element 5 by gluing or in any known manner, the conductive element being a planar, flexible electric conductor, such as a flat cable or a flex-type flexible conductor, for instance a flexible printed board, made of polyamide, which comprises a flexible base material. A so-called flexible conductor cable is also known, which consists of a flexible base material and conductors arranged on the surface thereof. The material of conductive patterns is mostly copper foil. Said conductor can also be arranged inside the planar spring element 5. These solutions have, for instance, the advantage that the conductor, cable, flat cable, flex conductor or the like can be applied from one part to the other protected from external impacts and strains by utilizing said spring element 5.

The drawings and the specification related thereto are only intended to illustrate the idea of the invention. The details of the invention may vary within the scope of the claims.

What is claimed is:

1. A hinged, foldable electronic device comprising a cover part and a base part, a hinge rotatably attaching said cover part to said base part for rotation between a closed position, in which the cover part overlies and covers the base part, and a fully opened, operating position in which the cover part extends at an angle greater than a predetermined limit angle relative to the base part, said electronic device further comprising a tensioned spring element for restricting the free operation of said hinge, said spring element having a first end rotatably-connected to said cover part and a second end rotatably-connected to said base part, the rotatable connections being about axes which are spaced from and parallel to the rotation axis of said hinge; said tensioned spring element having a spring force, when said first and second ends thereof are flexed apart, which urges the cover part into closed position against the base part when the cover part is rotated to an angle less than said predetermined limit angle, and which also urges the cover part into opened, operating position when the cover part is rotated to an angle greater than the predetermined limit angle relative to the base part.

2. A hinged foldable electronic device as claimed in claim 1, wherein the portion of the spring element between the first and second ends is curved on a plane that is substantially perpendicular to the rotation axis of the hinge.

3. A hinged foldable electronic device as claimed in claim 1, wherein at opening angles wider than said predetermined limit angle the spring force of the spring element forces the cover part into an operating position.

4. A hinged foldable electronic device as claimed in claim 3, wherein the spring element supports the device in the operating position.

5. A hinged foldable electronic device as claimed in claim 3, wherein the spring element lifts the rear edge of the base part of the device off the plane under the device.

6. A hinged foldable electronic device as claimed in claim 3, wherein in the operating position the opening angle between the cover part and the base part is between about 140° to 160°.

7. A hinged foldable electronic device as claimed in claim 1, wherein at opening angles smaller than said predetermined limit angle the spring force of the spring element forces the cover part against the base part into a completely closed position.

8. A hinged foldable electronic device as claimed in claim 7, wherein in the completely closed position of the device, the spring element is at least partly recessed in a groove provided on the outer surface of the cover part and base part.

9. A hinged foldable electronic device as claimed in claim 1, wherein the spring element has a substantially round cross-section.

10. A hinged foldable electronic device as claimed in claim 9, wherein the spring element is made of metal wire.

11. A hinged foldable electronic device as claimed in claim 1, wherein the spring element has a substantially planar cross-section.

12. A hinged foldable electronic device as claimed in claim 1, wherein at least part of the spring element is of conductive material and electrical signals between the cover part and the base part are conductible via the spring element.

13. A hinged foldable electronic device as claimed in claim 12, wherein an element for conducting electrical signals between the cover part and the base part is attached to the spring element.

14. A hinged foldable electronic device according to claim 1 in which the cover part extends at an angle between about 140° and 160° relative to the base part in fully opened, operating position.

* * * * *